United States Patent
Kurosawa et al.

(10) Patent No.: US 6,815,914 B2
(45) Date of Patent: Nov. 9, 2004

(54) CONTROL METHOD FOR LIGHT DEFLECTION DEVICE

(75) Inventors: Takaaki Kurosawa, Tokyo (JP); Hiroshi Kobayashi, Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/600,229

(22) Filed: Jun. 20, 2003

(65) Prior Publication Data

US 2004/0061468 A1 Apr. 1, 2004

Related U.S. Application Data

(62) Division of application No. 10/108,142, filed on Mar. 27, 2002, now Pat. No. 6,762,574.

(30) Foreign Application Priority Data

Apr. 9, 2001 (JP) ........................................ 2001/110204

(51) Int. Cl.[7] ............................................... H02P 6/00
(52) U.S. Cl. ........................................... 318/5; 318/254
(58) Field of Search ................................. 318/138, 254, 318/268–270, 430–431, 439, 720–724, 3–5

(56) References Cited

U.S. PATENT DOCUMENTS

| | | | |
|---|---|---|---|
| 3,848,087 A | * 11/1974 | Carrell | ........................ 358/413 |
| 4,114,073 A |   9/1978 | Uzuka | |
| 4,130,838 A | * 12/1978 | St. John | ...................... 358/412 |
| 4,820,949 A |   4/1989 | Mizobuchi et al. | |
| 4,879,498 A |   11/1989 | Shinohara et al. | |
| 5,053,619 A | * 10/1991 | Arimoto | ....................... 250/235 |
| 5,144,339 A | *  9/1992 | Ohashi et al. | .............. 347/261 |
| 5,289,001 A | *  2/1994 | Arimoto et al. | ............ 250/236 |
| 5,596,444 A | *  1/1997 | Eguchi | ......................... 359/210 |
| 5,670,837 A |   9/1997 | Boutaghou et al. | |
| 5,969,490 A |   10/1999 | Gotou | |
| 6,204,868 B1 |   3/2001 | Yamauchi et al. | |
| 6,465,918 B1 |   10/2002 | Itami et al. | |
| 6,545,379 B2 |   4/2003 | Gomyo | |

FOREIGN PATENT DOCUMENTS

DE            3425805 A1    1/1986
EP            1 031 867 A2    8/2000

* cited by examiner

*Primary Examiner*—Bentsu Ro
(74) *Attorney, Agent, or Firm*—Frishauf, Holtz, Goodman & Chick, P.C.

(57) ABSTRACT

The invention concerns a light deflection device, and a control method for the light deflection device, which are rich in expandability of drive control. The light deflection device includes a polygon mirror to reflect the light beam; a rotor, having a magnet, to rotate the polygon mirror attached to the rotor; a stator on which a plurality of drive coils are fixed so as to generate a rotational force; and a plurality of connecting ports through which the plurality of drive coils are electronically coupled to a plurality of drive circuits, each of which drives the drive coils while controlling the rotational force to be generated between the magnet and drive coils. One of the drive circuits controls the rotational force during a start-up operation and a steady-rotating operation of the rotor, while another one controls the rotational force during a decelerating operation of the rotor.

3 Claims, 3 Drawing Sheets

CONTROL METHOD FOR LIGHT DEFLECTION DEVICE

CROSS-REFERENCE TO RELATED APPLICATIONS

This application is a division of application Ser. No. 10/108,142 filed Mar. 27, 2002, now U.S. Pat. No. 6,762,574.

BACKGROUND OF THE INVENTION

The present invention relates to a brushless motor, a control method for the brushless motor, a light deflection device, and a control method for the light deflection device, which are rich in expandability of drive control.

Generally, in an image-forming apparatus such as a laser printer, a laser copier, a laser facsimile, and a composite device thereof, a light beam emitted from a light source such as a semiconductor laser is reflected and deflected by the mirror surface of a polygonal mirror rotating at a predetermined speed, scanned on an image recording medium such as a photosensitive drum, thereby records and forms an image.

The polygonal mirror is installed on the rotor of a brushless motor so as to structure a light deflection device and arranged in an image-writing system of an image-forming apparatus. A plurality of drive coils for acting rotary power to the rotor are controlled by a control signal from a drive circuit, thus the light deflection device controls the rotation of the polygonal mirror.

Therefore, the brushless motor constituting the light deflection device has a wire connection means, serving as a connecting port, for electrically connecting between the drive circuit and the drive coils and when the light deflection device is to be arranged in the writing unit, the wire connection means is electrically connected to the drive circuit.

Conventionally, the drive control of the brushless motor is executed by the drive circuit connected to the wire connection means, so that there is a disadvantage that the control function held by the drive circuit connected to the wire connection means is restricted.

Therefore, for example, when the drive coils are electrically connected to the drive circuit for controlling start-up operation and steady-rotating operation, the start-up operation and steady-rotating operation are just controlled by the drive circuit, so that when a request for a function for rapidly reducing the rotation of the motor is generated later, it is necessary to remove the drive coils together with the drive circuit, replace the drive circuit with a drive circuit additionally having a brake control function, and electrically connect it to the drive coils newly, thus a very complicated operation must be forcibly performed.

SUMMARY OF THE INVENTION

To overcome the abovementioned drawbacks in conventional brushless motors, the first object of the present invention is to provide a brushless motor rich in expandability of a control function capable of easily adding control, which cannot be executed by one drive circuit.

Further, the second object of the present invention is to provide a control method for a brushless motor capable of executing optimal drive control respectively in each mode from control of start-up operation and steady-rotating operation to control of deceleration and improving the efficiency and reliability of the motor.

Still further, the third object of the present invention is to provide a light deflection device rich in expandability of a control function capable of easily adding control, which cannot be executed by a single drive circuit.

Still further, the fourth object of the present invention is to provide a control method for a light deflection device capable of respectively executing optimal drive control in each mode from control of start-up operation and steady-rotating operation to control of deceleration and improving the efficiency and reliability of the motor.

Accordingly, to overcome the cited shortcomings, the abovementioned objects of the present invention can be attained by light deflection devices and brushless motors described as follow (1) A light deflection device for deflecting a light beam, comprising: a polygon mirror to reflect the light beam; a rotor, having a magnet, to rotate the polygon mirror attached to the rotor; a stator on which a plurality of drive coils are fixed so as to generate a rotational force between the magnet and the drive coils; and a plurality of connecting ports through which the plurality of drive coils are electronically coupled to a plurality of drive circuits, each of which drives the drive coils while controlling the rotational force to be generated between the magnet and the drive coils.

(2) The light deflection device of item 1, wherein the plurality of connecting ports include a first connecting port to which a first drive circuit is coupled, and a second connecting port to which a second drive circuit is coupled; and wherein the first drive circuit controls the rotational force during a start-up operation and a steady-rotating operation of the rotor, while the second drive circuit controls the rotational force during a decelerating operation of the rotor.

(3) The light deflection device of item 1, wherein the plurality of connecting ports include a first connecting port to which a first drive circuit is coupled, and a second connecting port to which a second drive circuit is coupled; and wherein the first drive circuit controls the rotational force during a start-up operation and a steady-rotating operation of the rotor, while the second drive circuit also controls the rotational force during the start-up operation of the rotor, serving as an auxiliary driving source.

(4) The light deflection device of item 1, wherein the plurality of connecting ports include a first connecting port to which a first drive circuit is coupled, a second connecting port to which a second drive circuit is coupled, and a third connecting port to which a third drive circuit is coupled; and wherein the first drive circuit controls the rotational force during a start-up operation and a steady-rotating operation of the rotor, while the second drive circuit controls the rotational force during a decelerating operation of the rotor, and further, the third drive circuit also controls the rotational force during the start-up operation of the rotor, serving as an auxiliary driving source.

(5) The light deflection device of item 1, wherein the light deflection device is employed in an image-writing system of an image-forming apparatus.

(6) A method for controlling a light deflection device, which comprises a polygon mirror to reflect a light beam, a rotor having a magnet, to rotate the polygon mirror attached to the rotor, a stator on which a plurality of drive coils are fixed so as to generate a rotational force between the magnet and the drive coils and a plurality of connecting ports through which the plurality of drive coils are electronically coupled to a plurality of drive circuits, the method comprising the steps of: controlling the rotational force during a start-up operation and a steady-rotating operation of the rotor by a first drive circuit included in the plurality of drive circuits; and controlling the rotational force during a decelerating operation of the rotor by a second drive circuit included in the plurality of drive circuits.

(7) A method for controlling a light deflection device, which comprises a polygon mirror to reflect a light beam, a rotor having a magnet, to rotate the polygon mirror attached to the rotor, a stator on which a plurality of drive coils are fixed so as to generate a rotational force between the magnet and the drive coils and a plurality of connecting ports through which the plurality of drive coils are electronically coupled to a plurality of drive circuits, the method comprising the steps of: controlling the rotational force during a start-up operation and a steady-rotating operation of the rotor by a first drive circuit included in the plurality of drive circuits; and controlling the rotational force during the start-up operation of the rotor by a second drive circuit included in the plurality of drive circuits, in such a manner that the second drive circuit serves as an auxiliary driving source.

(8) A method for controlling a light deflection device, which comprises a polygon mirror to reflect a light beam, a rotor having a magnet, to rotate the polygon mirror attached to the rotor, a stator on which a plurality of drive coils are fixed so as to generate a rotational force between the magnet and the drive coils and a plurality of connecting ports through which the plurality of drive coils are electronically coupled to a plurality of drive circuits, the method comprising the steps of: controlling the rotational force during a start-up operation and a steady-rotating operation of the rotor by a first drive circuit included in the plurality of drive circuits; controlling the rotational force during a decelerating operation of the rotor by a second drive circuit included in the plurality of drive circuits; and controlling the rotational force during the start-up operation of the rotor by a third drive circuit included in the plurality of drive circuits, in such a manner that the third drive circuit serves as an auxiliary driving source.

(9) A brushless motor, comprising: a rotor having a magnet; a stator on which a plurality of drive coils are fixed so as to generate a rotational force between the magnet and the drive coils; and a plurality of connecting ports through which the plurality of drive coils are electronically coupled to a plurality of drive circuits, each of which drives the drive coils while controlling the rotational force to be generated between the magnet and the drive coils.

(10) The brushless motor of item 9, wherein the plurality of connecting ports include a first connecting port to which a first drive circuit is coupled, and a second connecting port to which a second drive circuit is coupled; and wherein the first drive circuit controls the rotational force during a start-up operation and a steady-rotating operation of the brushless motor, while the second drive circuit controls the rotational force during a decelerating operation of the brushless motor.

(11) The brushless motor of item 9, wherein the plurality of connecting ports include a first connecting port to which a first drive circuit is coupled, and a second connecting port to which a second drive circuit is coupled; and wherein the first drive circuit controls the rotational force during a start-up operation and a steady-rotating operation of the brushless motor, while the second drive circuit also controls the rotational force during the start-up operation of the brushless motor, serving as an auxiliary driving source.

(12) The brushless motor of item 9, wherein the plurality of connecting ports include a first connecting port to which a first drive circuit is coupled, a second connecting port to which a second drive circuit is coupled, and a third connecting port to which a third drive circuit is coupled; and wherein the first drive circuit controls the rotational force during a start-up operation and a steady-rotating operation of the brushless motor, while the second drive circuit controls the rotational force during a decelerating operation of the brushless motor, and further, the third drive circuit also controls the rotational force during the start-up operation of the brushless motor, serving as an auxiliary driving source.

(13) The brushless motor of item 9, wherein the brushless motor is incorporated in a light deflection device employed in an image-writing system of an image-forming apparatus, to rotate a polygon mirror.

Further, to overcome the abovementioned problems, other brushless motors and light deflection devices, embodied in the present invention, will be described as follow:

(14) A brushless motor, characterized in that, in a motor body having a rotary rotor having a magnet and a plurality of drive coils for acting rotary power to the rotor, two or more wire connection means capable of electrically connecting respectively to two or more drive circuits for controlling the drive coils are provided.

(15) A control method for a brushless motor, characterized in that one of the wire connection means of the brushless motor stated in item 14 is electrically connected to the first drive circuit, and the other one is electrically connected to the second drive circuit, and start-up operation and steady-rotating operation are controlled by the first drive circuit, and deceleration is controlled by the second drive circuit.

(16) A control method for a brushless motor, characterized in that one of the wire connection means of the brushless motor stated in item 14 is electrically connected to the first drive circuit, and the other one is electrically connected to the second drive circuit, and start-up operation and steady-rotating operation are controlled by the first drive circuit, and start support is controlled by the second drive circuit.

(17) A control method for a brushless motor, characterized in that one of the wire connection means of the brushless motor stated in item 14 is electrically connected to the first drive circuit, and another one is electrically connected to the second drive circuit, and still another one is electrically connected to the third drive circuit, and start-up operation and steady-rotating operation are controlled by the first drive circuit, and deceleration is controlled by the second drive circuit, and start support is controlled by the third drive circuit.

(18) A light deflection device, characterized in that a polygonal mirror is installed on the rotor of the brushless motor stated in item 14.

(19) A control method for a light deflection device, characterized in that one of the wire connection means of the light deflection device stated in item 18 is electrically connected to the first drive circuit, and the other one is electrically connected to the second drive circuit, and start-up operation and steady-rotating operation are controlled by the first drive circuit, and deceleration is controlled by the second drive circuit.

(20) A control method for a light deflection device, characterized in that one of the wire connection means of the light deflection device stated in item 18 is electrically connected to the first drive circuit, and the other one is electrically connected to the second drive circuit, and start-up operation and steady-rotating operation are controlled by the first drive circuit, and start support is controlled by the second drive circuit.

(21) A control method for a light deflection device, characterized in that one of the wire connection means of the light deflection device stated in item 18 is electrically connected to the first drive circuit, and another one is electrically connected to the second drive circuit, and still another one is electrically connected to the third drive circuit, and start-up operation and steady-rotating operation are controlled by the first drive circuit, and deceleration is controlled by the second drive circuit, and start support is controlled by the third drive circuit.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

The embodiment of the present invention will be explained hereunder with reference to the accompanying drawings.

Figure 1:
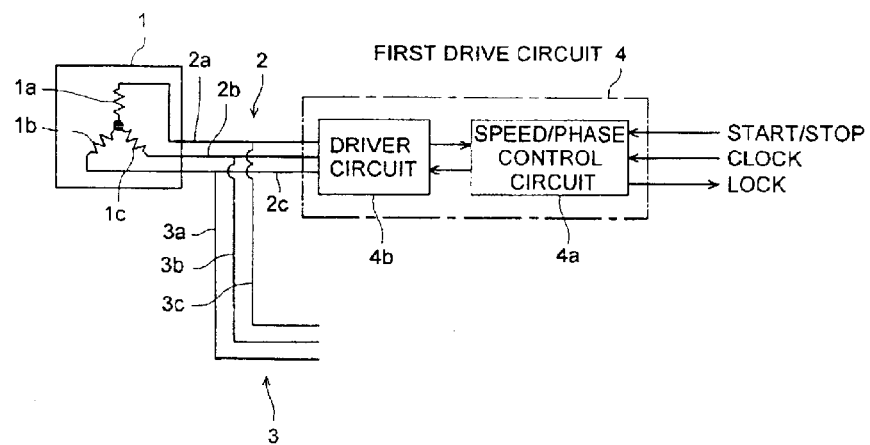
FIG. 1 is a schematic block diagram of the brushless motor embodied in the present invention.

FIG. 1 is a schematic block diagram of the brushless motor relating to the present invention. A motor body 1 has a well-known structure that a magnet (not shown in the drawing) is attached to a rotor (not shown in the drawing) installed so as to rotate and a plurality of drive coils 1a, 1b, and 1c for acting rotary power to the rotor are installed and to the drive coils 1a, 1b, and 1c of the motor body 1, one end of a first wire connection means 2 is connected.

The first wire connection means 2, serving as a first connecting port, is composed of wires 2a, 2b, and 2c respectively connected to the drive coils 1a, 1b, and 1c and electrically connected to a first drive circuit 4 for exclusively driving and controlling the motor body 1.

In the state shown in the drawing, the first drive circuit 4 for controlling start-up operation and steady-rotating operation is connected to the first wire connection means 2, thus a control current from a speed/phase control circuit 4a for controlling the speed and phase is supplied to the drive coils 1a, 1b, and 1c of the motor body 1 via the wires 2a, 2b, and 2c by switching the coil by a driver circuit 4b and controls start-up operation and steady-rotating operation.

In the first wire connection means 2, a second wire connection means 3, serving as a second connecting port, composed of wires 3a, 3b, and 3c respectively branched in the middle of the wires 2a, 2b, and 2c is installed. The second wire connection means 3 is in a free state when the drive coils 1a, 1b, and 1c and the first drive circuit 4 are electrically connected by the first wire connection means 2 and when the first wire connection means 2 is connected to the first drive circuit 4, the drive coils 1a, 1b, and 1c can be electrically connected to a different drive circuit from the first drive circuit 4.

The brushless motor shown in this embodiment, in addition to the first wire connection means 2 for electrically connecting to the first drive circuit 4 for exclusively driving and controlling the drive coils 1a, 1b, and 1c, has the second wire connection means 3 for electrically connecting to a different drive circuit from the first drive circuit 4 in the motor body 1 at the same time, so that a drive circuit for executing control which cannot be executed by the first drive circuit 4 can be additionally connected without exchanging the first drive circuit 4, thus a brushless motor capable of easily expanding the control function can be obtained.

Next, the control method for such a brushless motor will be explained.

Figure 2:
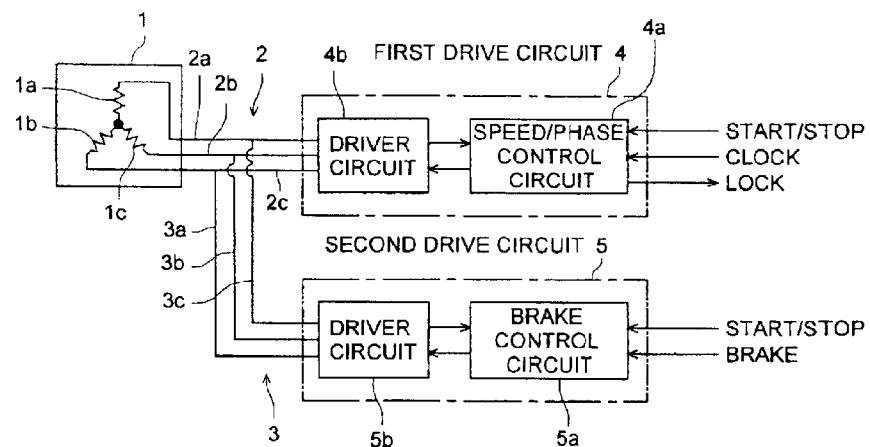
FIG. 2 is a schematic view showing an example of the brushless motor control method embodied in the present invention.

FIG. 2 shows an example that in the state shown in FIG. 1, a control brake circuit 5 for controlling deceleration as a second drive circuit is additionally connected to the second wire connection means 3 and the drive circuits 1a, 1b, and 1c are electrically connected to the control brake circuit 5.

The control brake circuit 5 can supply a control current from a brake control circuit 5a for operating on the basis of a brake instruction from a control unit not shown in the drawing to the drive coils 1a, 1b, and 1c via the wires 3a, 3b, and 3c of the second wire connection means 3 by switching the coil by a driver circuit 5b and the rotor of the motor body 1 is forcibly decelerated in a short time by this brake control.

In this state, at the time of start-up operation and steady-rotating operation of the motor body 1, the first drive circuit 4 connected to the first wire connection means 2 controls start-up operation and steady-rotating operation. On the other hand, when the rotor is stopped, the control brake circuit 5 which is the second drive circuit additionally connected to the second wire connection means 3 brakes the rotation of the motor body 1 and executes deceleration control.

Figure 3:
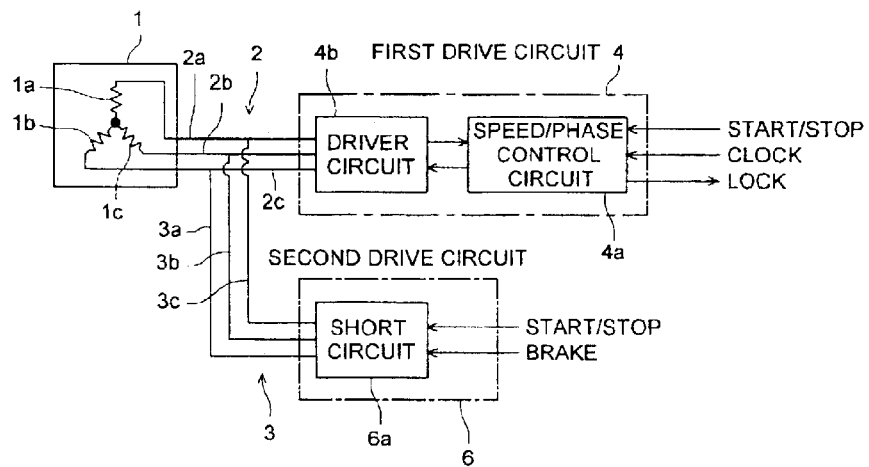
FIG. 3 is a schematic view showing another example of the brushless motor control method embodied in the present invention.

Such deceleration control, as shown in FIG. 3, can be executed by additionally connecting a forced brake circuit 6 in place of the control brake circuit 5.

The forced brake circuit 6 has a short circuit 6a for short-circuiting the counter electromotive voltage of the drive coils 1a, 1b, and 1c generated by the rotation of the rotor, and when the short circuit 6a is operated on the basis of a brake instruction from a control unit not shown in the drawing, it takes the rotational energy of the rotor and brakes the rotation of the rotor, and the rotor of the motor body 1 is forcibly decelerated by this forced brake control and stopped in a short time.

Also in this state, at the time of start-up operation and steady-rotating operation of the motor body 1, the first drive circuit 4 connected to the first wire connection means 2 controls start-up operation and steady-rotating operation. On the other hand, when the rotor is stopped, the control brake circuit 6 which is the second drive circuit additionally connected to the second wire connection means 3 brakes the rotation of the motor body 1 and executes deceleration control.

Figure 4:
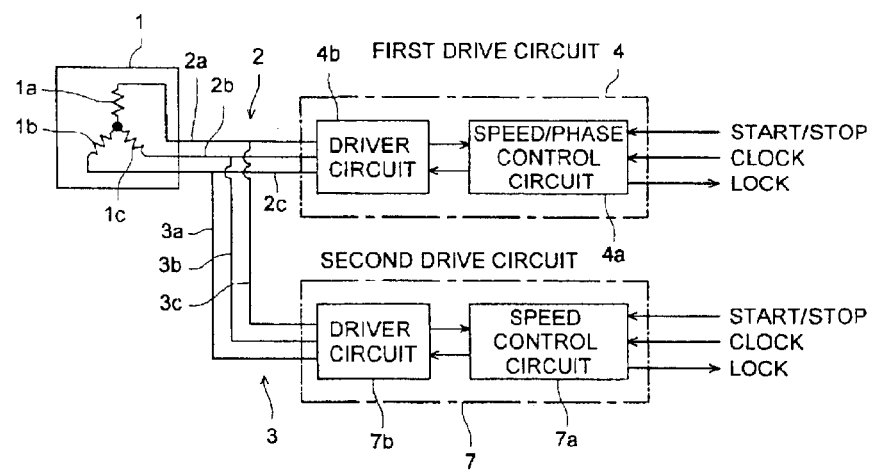
FIG. 4 is a schematic view showing still another example of the brushless motor control method embodied in the present invention.

FIG. 4 shows an example that in the state shown in FIG. 1, a start support circuit 7 for executing support at the start of the motor body 1 as a second drive circuit is additionally connected to the second wire connection means 3 and the drive circuits 1a, 1b, and 1c are electrically connected to the start support circuit 7.

The start support circuit 7 can supply a control current from a speed control circuit 7a for operating on the basis of a start instruction from a control unit not shown in the drawing to the drive coils 1a, 1b, and 1c via the wires 3a, 3b, and 3c of the second wire connection means 3 by switching the coil by a driver circuit 7b and at the start of the motor body 1, rotational energy is supplied also from the start support circuit 7, thus the start time can be shortened.

Therefore, in this state, at the start of the motor body 1, rotational energy is supplied from the first drive circuit 4 connected to the first wire connection means 2 and rotational energy is also supplied from the start support circuit 7 which is the second drive circuit connected to the second wire connection means 3, so that the motor body 1 can reach the stationary rotation in a short time. Particularly, when the start load becomes large due to deterioration of the motor body 1, by additionally connecting the start support circuit 7 using the second wire connection means 3, the start time can be recovered.

The start support circuit 7 additionally connected to the second wire connection means 3 may just execute start support, so that the phase control function may not be installed always and only by adding an inexpensive control circuit, the start time can be shortened easily.

As mentioned above, according to the control method for the brushless motor relating to the present invention, optimal drive control can be executed in each mode respectively from control of start-up operation and steady-rotating operation to control of deceleration and the efficiency and reliability of the motor can be improved.

In the embodiment explained above, the wire connection means for the brushless motor has two wire connection means in total including the first wire connection means 2 electrically connectable to the first drive circuit 4 and the second wire connection means 3 electrically connectable to the second drive circuit. However, the wire connection means for the brushless motor may have three or more wire connection means such as the third, fourth, . . . wire connection means (serving as the third, fourth, . . . connecting port), electrically connectable to three or more drive circuits such as the third, fourth, . . . drive circuits.

Further, in this case, in the control method for the brushless motor, for example, the first drive circuit for controlling start-up operation and steady-rotating operation is electrically connected to the first wire connection means, and the second drive circuit for controlling deceleration is electrically connected to the second wire connection means, and moreover the third drive circuit for controlling start support is electrically connected to the third wire connection means, thus more thorough drive control can be executed in each mode of start, stationary rotation, and deceleration.

Further, the second, third, . . . wire connection means are not limited to those branched from the wires 2a, . . . of the first wire connection means 2 and may be those that one end is directly connected to each of the drive coils 1a, . . . in the same way as with the first wire connection means 2.

Further, the wires of the second, third, . . . wire connection means are not limited to those of the same number as that of wires 2a, . . . of the first wire connection means 2 and may be properly increased or decreased depending the number of drive circuits additionally connected.

Furthermore, each wire connection means is not limited to the one that the end thereof is bared and may be properly provided with a connection means such as a connector for connecting to each drive circuit.

Figure 5:
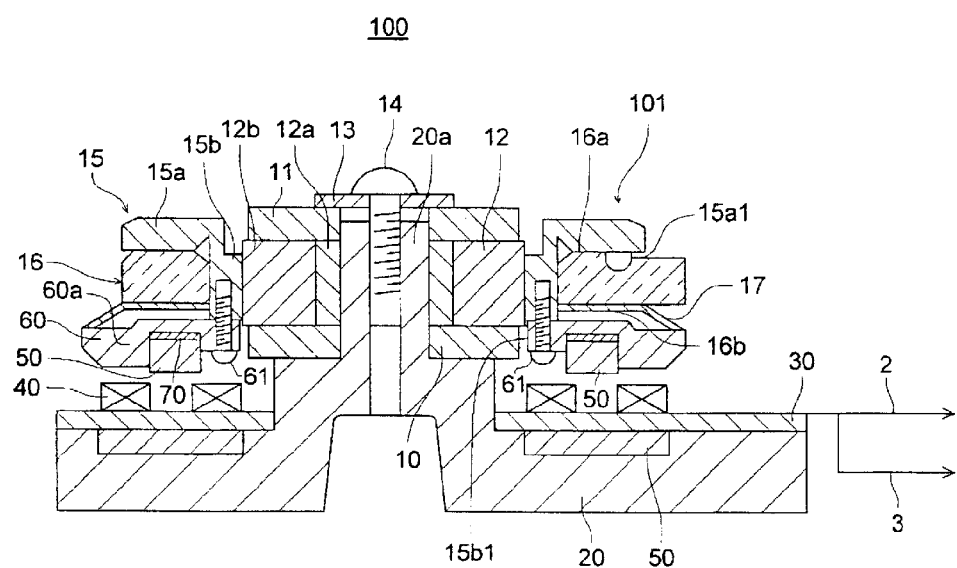
FIG. 5 is a cross sectional view showing an example of the light deflection device embodied in the present invention.

FIG. 5 shows an example of a light deflection device using the brushless motor explained above.

A light deflection device 100 shown in this embodiment is incorporated into, for example, a beam scanning optical device, deflects laser light by rotation of the polygonal mirror 16, and is fixed on the device side by a base plate 20.

A flange 15 uses a material of aluminum or iron, and a disk 15a is installed at the end of a cylindrical part 15b, and one end face 16a of the polygonal mirror 16 is in contact with a reference plane 15a1 of the disk 15a for loading the mirror, and the disk 15a is assembled so as to rotate together via an elastic member 17 between the disk 15a and a mirror holding plate 6. The cylindrical part 15b of the flange 15 is joined and integrated to an outer cylinder bearing 12b by a means such as shrink fitting so as to structure a rotor and the polygonal mirror 16 is installed on the rotor so as to form a mirror unit 101.

The mirror unit 101 lies between a lower thrust bearing 10, an upper thrust bearing 11, and an inner cylinder bearing 12a and is inserted into a shaft 20a of the base plate 20 and a screw 14 is screwed and attached to the shaft 20a via a plate 13.

On the base plate 20, a fixing yoke 50 is installed and moreover a printed board 30, serving as a stator, with drive coils 40 attached is installed. A permanent magnet 50 for generating torque is arranged opposite to the drive coils 40, and the permanent magnet 50 is installed in a concavity 60a formed in a circular mirror holding plate 60 via an adhesive, and a polygonal motor is structured by the aforementioned arrangement relation.

A revolving shaft 12 is composed of the inner cylinder bearing 12a and the outer cylinder bearing 12b, and the outer cylinder bearing 12b can rotate for the inner cylinder bearing 12a, and the flange 15 is joined to the outer cylinder bearing 12b by the cylindrical part 15b. In this embodiment, the bearing structure is a dynamic pressure bearing structure composed of the lower thrust bearing 10, the upper thrust bearing 11, the inner cylinder bearing 12a, and the outer cylinder bearing 12b and a dynamic pressure generation groove is formed in both or either of the lower thrust bearing surface and the outer peripheral surface of the inner cylinder bearing 12a.

The device is structured so that when the cylindrical part 15b of the flange 15 is joined to the outer cylinder bearing 12b of the revolving shaft 12, the joining strength is increased and moreover when the outer periphery of the cylindrical part 12b is set as an attaching reference for the central revolving shaft, the central accuracy of the shaft of the polygonal mirror 16 is improved.

The cylindrical part 15b of the flange 15 is joined to the outer cylinder bearing 12b of the revolving shaft 12 preferably by shrink fitting or may be joined by another press fitting. Such joining eliminates the turning angle of the polygonal mirror 16 at the time of attaching and the accuracy for the shaft center can be improved more surely.

For preparation, after joining the flange 15 and the outer cylinder bearing 12b, the mirror loading reference plane 15a1 for attaching the polygonal mirror 16 to the disk 15a is cut, and the polygonal mirror 16 is inserted into the cylindrical part 15b of the flange 15, and one end face 16a of the polygonal mirror 16 is made contact with the reference plane 15a1.

Between the other end face 16b of the polygonal mirror 16 and the mirror holding plate 6, the elastic member 17 such as a plate spring lies, and the end face of the cylindrical part 15b of the flange 15 and the mirror holding plate 60 are joined and fixed by a joining member 61 such as a screw, and the pressing force to the polygonal mirror 16 by the elastic member 17 is stabilized, and the polygonal mirror 16 is fixed free of distortion.

To the respective drive coils 40, one end of the first wire connection means 2 for electrically connecting to the first drive circuit is connected, and the second wire connection means 3 is branched from the first wire connection means 2, and electrical connection with a different drive circuit from the first drive circuit is enabled. The constitution of the first wire connection means 2 and the second wire connection means 3 and the control method using the means are described above, so that the explanation thereof will be omitted here.

Further, also in the light deflection device 100, as mentioned above, the second wire connection means 3 is not limited to the one branched from the first wire connection means 2. Furthermore, with respect to the wire connection means, wire connection means such as the third, fourth, . . . electrically connectable to the third, fourth, . . . drive circuits respectively may be provided and in the same way, by the third and fourth drive circuits, more thorough drive control can be executed in each mode of start-up, steady-rotation, and deceleration.

According to the present invention, it becomes possible to provide a brushless motor rich in expandability of a control function capable of easily adding control which cannot be executed by one drive circuit.

Further, according to the present invention, it becomes possible to provide a control method for a brushless motor capable of executing optimal drive control respectively in each mode from control of start-up operation and steady-rotating operation to control of deceleration and improving the efficiency and reliability of the motor.

Still further, according to the present invention, it becomes possible to provide a light deflection device rich in expandability of a control function capable of easily adding control, which cannot be executed by one drive circuit.

Still further, according to the present invention, it becomes possible to provide a control method for a light deflection device capable of executing optimal drive control respectively in each mode from control of start-up operation and steady-rotating operation to control of deceleration and improving the efficiency and reliability of the motor.

What is claimed is:

1. A method for controlling a light deflection device, wherein the light deflection device comprises a polygon mirror to reflect a light beam, a rotor attached to said polygon mirror and having a magnet to rotate said polygon mirror, a stator on which a plurality of drive coils are fixed so as to generate a rotational force between said magnet and said drive coils, and a plurality of connecting ports through which said plurality of drive coils are electronically coupled to a plurality of drive circuits, the said method comprising:

controlling said rotational force during a start-up operation and a steady-rotating operation of said rotor by a first drive circuit included among said plurality of drive circuits; and controlling said rotational force during a decelerating operation of said rotor by a second drive circuit included among said plurality of drive circuits.

2. A method for controlling a light deflection device, wherein the light deflection device comprises a polygon mirror to reflect a light beam, a rotor attached to said polygon mirror and having a magnet to rotate said polygon mirror, a stator on which a plurality of drive coils are fixed so as to generate a rotational force between said magnet and said drive coils, and a plurality of connecting ports through which said plurality of drive coils are electronically coupled to a plurality of drive circuits, the said method comprising:

controlling said rotational force during a start-up operation and a steady-rotating operation of said rotor by a first drive circuit included among said plurality of drive circuits; and controlling said rotational force during said start-up operation of said rotor by a second drive circuit included among said plurality of drive circuits, in such a manner that said second drive circuit serves as an auxiliary driving source.

3. A method for controlling a light deflection device, wherein the light deflection device comprises a polygon mirror to reflect a light beam, a rotor attached to said polygon mirror and having a magnet to rotate said polygon mirror, a stator on which a plurality of drive coils are fixed so as to generate a rotational force between said magnet and said drive coils, and a plurality of connecting ports through which said plurality of drive coils are electronically coupled to a plurality of drive circuits, the said method comprising:

controlling said rotational force during a start-up operation and a steady-rotating operation of said rotor by a first drive circuit included among said plurality of drive circuits;

controlling said rotational force during a decelerating operation of said rotor by a second drive circuit included among said plurality of drive circuits; and controlling said rotational force during said start-up operation of said rotor by a third drive circuit included in said plurality of drive circuits, in such a manner that said third drive circuit serves as an auxiliary driving source.

* * * * *